Figure 1:
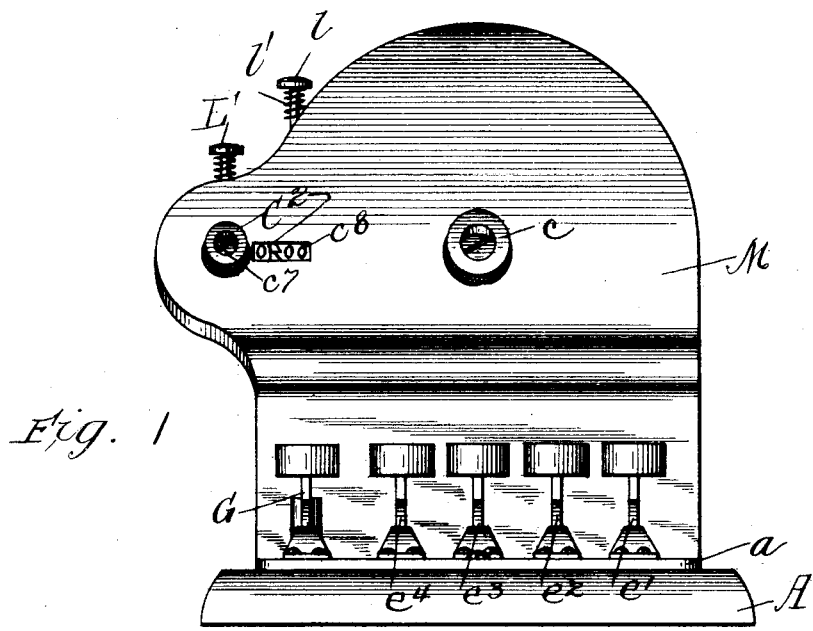
Figure 2:
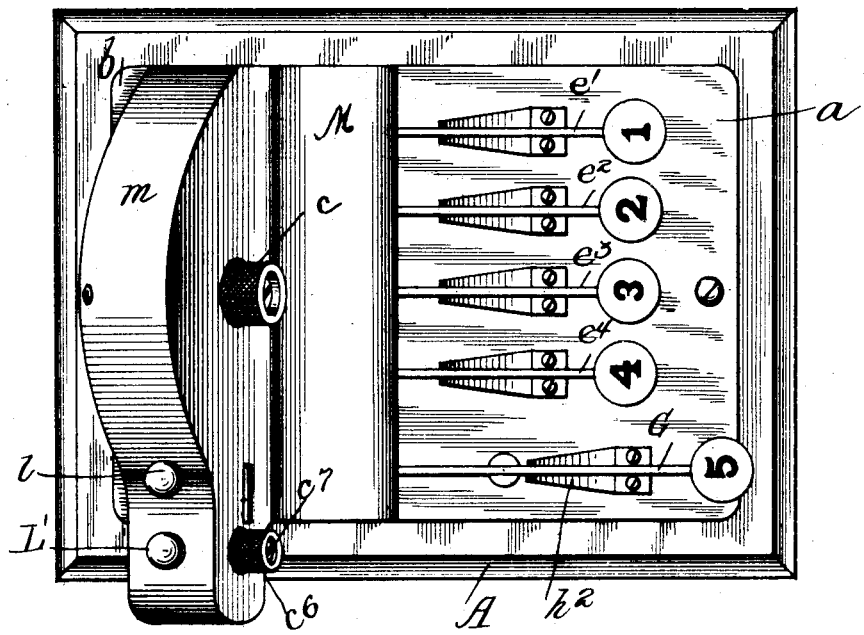

No. 792,035. PATENTED JUNE 13, 1905.
J. D. HILLIARD, Jr.
SYNCHRONIZING DEVICE.
APPLICATION FILED NOV. 23, 1904.
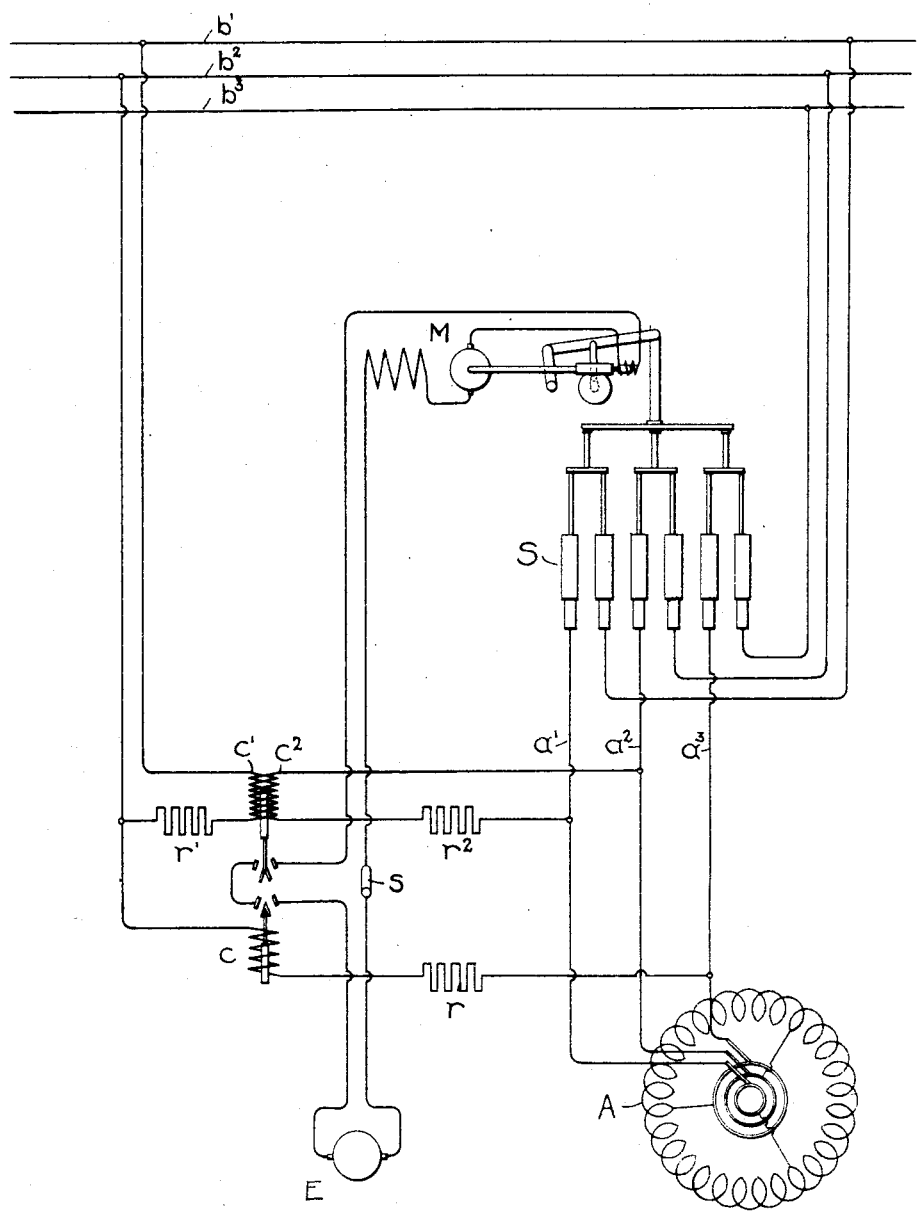
Witnesses.
Inventor.
John D. Hilliard Jr.
by
Atty.

No. 792,035.

Patented June 13, 1905.

UNITED STATES PATENT OFFICE.

JOHN D. HILLIARD, JR., OF GLENS FALLS, NEW YORK, ASSIGNOR TO GENERAL ELECTRIC COMPANY, A CORPORATION OF NEW YORK.

SYNCHRONIZING DEVICE.

SPECIFICATION forming part of Letters Patent No. 792,035, dated June 13, 1905.

Application filed November 23, 1904. Serial No. 233,949.

*To all whom it may concern:*

Be it known that I, JOHN D. HILLIARD, Jr., a citizen of the United States, residing at Glens Falls, in the county of Warren and State of New York, have invented certain new and useful Improvements in Synchronizing Devices, of which the following is a specification.

My invention relates to the synchronizing of alternating-current machines; and its object is to provide synchronizing means which shall act automatically to close the circuit of an alternating-current machine at the instant it is exactly in phase with the source of current to which it is to be connected. In synchronizing devices it has been customary heretofore to employ the opposing or cumulative effects of two electromotive forces derived, respectively, from the incoming machine and from the bus-bars or other machine with which it is to be synchronized. This practice is open to the objection that the resultant of two electromotive forces or currents, which are either approximately in phase or approximately in opposition, varies very little in magnitude, with considerable variation in the phase angle between its two components. Consequently whether the opposing or cumulative effects of the two electromotive forces are employed no well-defined indication of exact synchronism is obtained.

In a patent, No. 722,345, issued to J. E. Woodbridge March 10, 1903, is described a synchronism-indicator which employs two electromotive forces derived from different phases of the two machines to be synchronized. The two electromotive forces are so combined in a dynamometer instrument that an indication of synchronism is given when the two machines are in phase, and since the two electromotive forces are out of phase with each other when the machines are in phase a slight difference in the phase angle makes a considerable difference in the resultant effect.

My invention consists in utilizing the principle disclosed in the above-mentioned patent to provide an automatic synchronizer which is very sensitive in regard to slight variations from exact synchronism.

My invention consists in supplementing the effect of the two electromotive forces of currents ordinarily employed derived from corresponding phases of two machines with a third current or electromotive force out of phase with the other two and so arranging the automatic switch mechanism that it is operated only by the simultaneous action of the devices controlled by the above-mentioned currents or electromotive forces. Since when the first two currents or electromotive forces are at zero or maximum value the other electromotive force is at an intermediate value in which an appreciable variation in magnitude is produced by a small variation in the phase-angle, a sensitive adjustment may be obtained.

More specifically considered, my invention consists in providing two magnet-coils with a common armature energized from corresponding phases of the two machines and a third coil with an independent armature energized from different phases of the two machines and means operative only upon the simultaneous movement of the two armatures for closing the circuit of the machine to be synchronized.

Still more specifically considered, my invention consists in the combination of a synchronous alternating-current machine and a switch for connecting it to a second machine or to the station bus-bars, an electroresponsive means for operating the switch, and two relays controlling the circuit of the electroresponsive means, one relay being controlled by the joint action of two currents derived, respectively, from corresponding phases of the one machine and the other machine or bus-bars and the other relay being controlled by a current derived from different phases of the two machines.

My invention will best be understood by reference to the accompanying drawing, which shows diagrammatically an automatic synchronizing device arranged in accordance with my invention.

In the drawing, A represents a three-phase alternator. $a'$, $a^2$, and $a^3$ are the leads connecting the alternator, through the switch S, to the leads from a second machine or the station bus-bars $b'$, $b^2$, and $b^3$.

M represents an electric motor which is operatively connected to the switch S, so that when energized it moves it to closed position. The motor M is supplied with current from the exciter or other suitable source E. The circuit of motor M is interrupted by two relays, which are controlled, respectively, by the joint action of the magnet-coils $c'$ and $c^2$ and by the sole action of the magnet-coil $c$. The magnet-coil $c'$ is connected across the bus-bars $b'$ and $b^2$, and the coil $c^2$, coöperating therewith, is connected across the corresponding leads $a'$ and $a^2$. $r'$ and $r^2$ represent resistances or other current-limiting or phase-regulating devices in circuit with the coils $c'$ and $c^2$. Obviously the coils $c'$ and $c^2$ may be connected in the well-known manner to assist or to oppose each other when the machine A is in synchronism with the voltage of the bus-bars, and the relay controlled thereby will be closed or opened when synchronism occurs, according as the coils assist or oppose each other. In the particular arrangement shown the coils are supposed to assist each other at synchronism, so as to close the relay. The second relay in the motor-circuit is controlled by a single magnet-coil $c$, which is connected between the bus-bar $b^2$ and the lead $a^3$. The current through the coil $c$ is thus sixty degrees ahead of or behind the current in the coils $c'$ and $c^2$ at synchronism, and consequently when the currents in the latter coils are at their maximum or minimum value the current in the third coil $c$ will be at one-half its maximum value, which is a point on the current curve at which a small variation in the phase-angle produces an appreciable variation in magnitude. Consequently if the relay controlled by this coil $c$ be arranged to open or close at the instant when the current through the coil $c$ is at one-half its maximum value and if this relay is connected in series with the relay controlled by the joint action of the coils $c'$ and $c^2$, as shown, the motor M will be energized only upon the simultaneous action of the relays, and since the relay controlled by coil $c$ is sensitive to a very small variation from exact synchronism it follows that the synchronizing action is very accurate.

I have shown a switch $s$ in the circuit of the motor M, the purpose of this switch being to maintain the motor-circuit open until the alternator A is at substantially the proper speed. Otherwise the synchronizing device might act to close the circuit of the alternator A when its voltage was in phase with the bus-bars, but when its speed was too high or too low, so as to produce appreciable cross-currents if not a falling out of step. If the switch $s$ is not closed, however, until the machine A is at substantially the proper speed, the synchronizing device, as described, will automatically insure the closing of the generator circuit at the proper instant.

I do not desire to limit myself to the particular construction and arrangement of parts here shown, but aim in the appended claims to cover all modifications which are within the scope of my invention.

What I claim as new, and desire to secure by Letters Patent of the United States, is—

1. In a synchronizing device, in combination with an alternating-current dynamo-electric machine, a switch adapted to connect said machine to a source of alternating current, a relay comprising two magnet-coils energized from corresponding phases of said machine and of said source, a second relay comprising a magnet-coil energized with current of a different phase from the current in the other two coils, and an electroresponsive device operative upon the simultaneous operation of said relays to close said switch.

2. In a synchronizing device for alternating-current circuits, two magnet-coils energized from corresponding phases of the two circuits to be connected, an armature controlled by the joint action of said coils, a third coil energized by current of a different phase from that in the other two coils, an armature controlled by said third coil, and means responsive to the simultaneous operation of said armatures for connecting said two circuits.

3. In a synchronizing device for polyphase circuits, two magnet-coils energized from corresponding phases of the two circuits to be connected, an armature controlled by the joint action of said coils, a third coil connected between unlike phases of said two circuits, an armature controlled by said third coil, and means responsive to the simultaneous operation of said armatures for connecting said two circuits.

4. In a synchronizing device, in combination with a polyphase dynamo-electric machine, a switch adapted to connect said machine to the station bus-bars, a relay comprising two coacting magnet-coils energized from corresponding phases of said machine and said bus-bars, a second relay comprising a magnet-coil connected between unlike phases of said machine and said bus-bars, and an electroresponsive device operative upon the simultaneous action of said relays to close said switch.

5. In a synchronizing device, in combination with a polyphase dynamo-electric machine, a switch adapted to connect said machine to a source of polyphase current, electroresponsive means for closing said switch, two normally open relays in series with said means, two magnet-coils energized from corresponding phases of said machine and of said No. 792,041. PATENTED JUNE 13, 1905.
C. W. HORN.
ADDING MACHINE.
APPLICATION FILED JAN. 2, 1904.

5 SHEETS—SHEET 1.

Witnesses:
Harry C. White
Ray White

Inventor
Charles W. Horn
By Charles W. Hill, Atty